Nov. 16, 1943.  C. D. PETERSON ET AL  2,334,282
HYDRAULIC COUPLING
Filed April 23, 1940  3 Sheets-Sheet 2
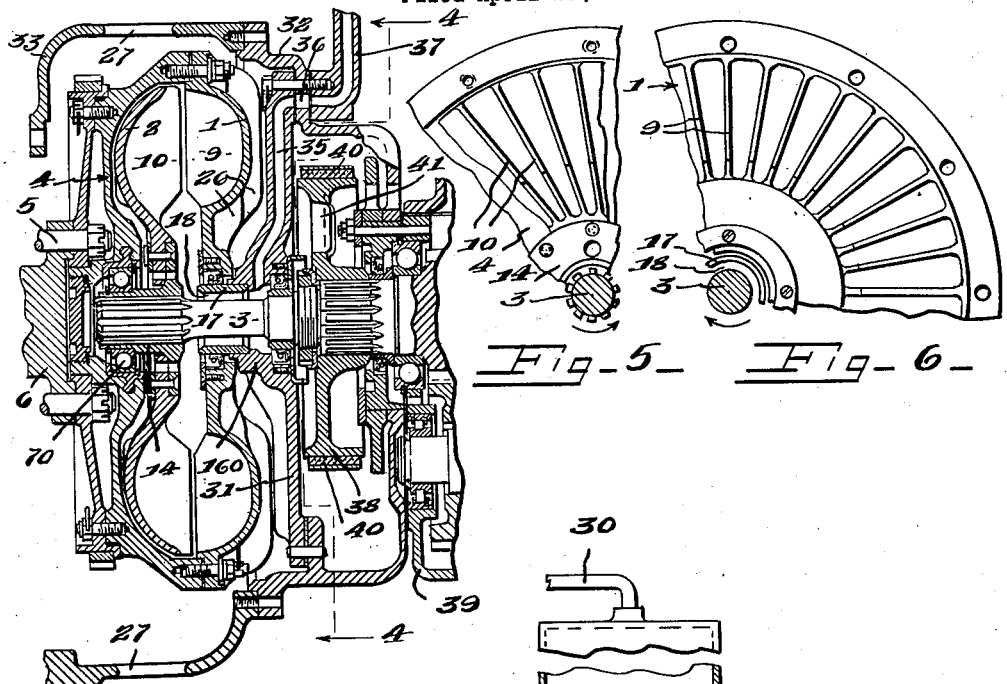
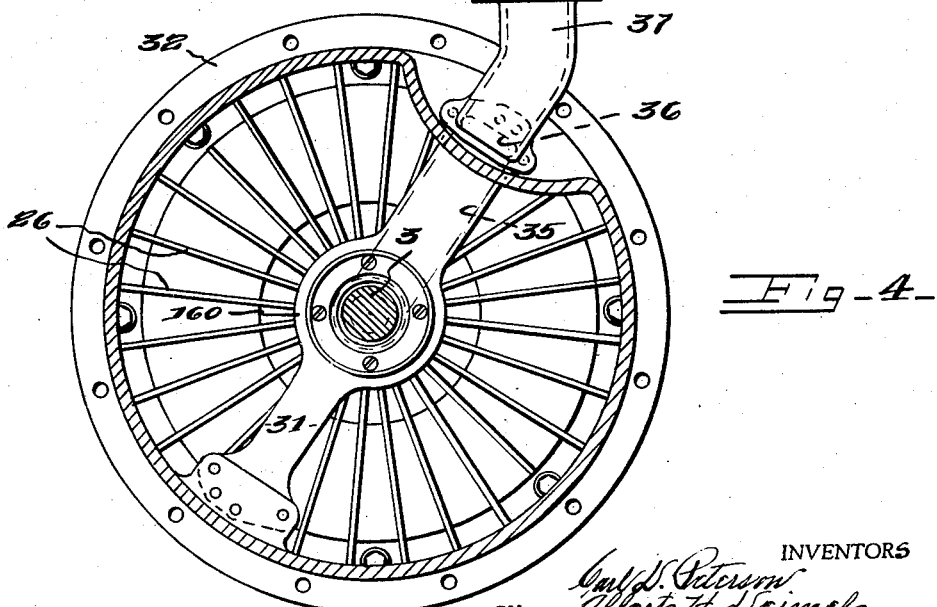
INVENTORS
Carl D. Peterson
Albert H. Leimel
BY Bardell & Thompson
ATTORNEYS.

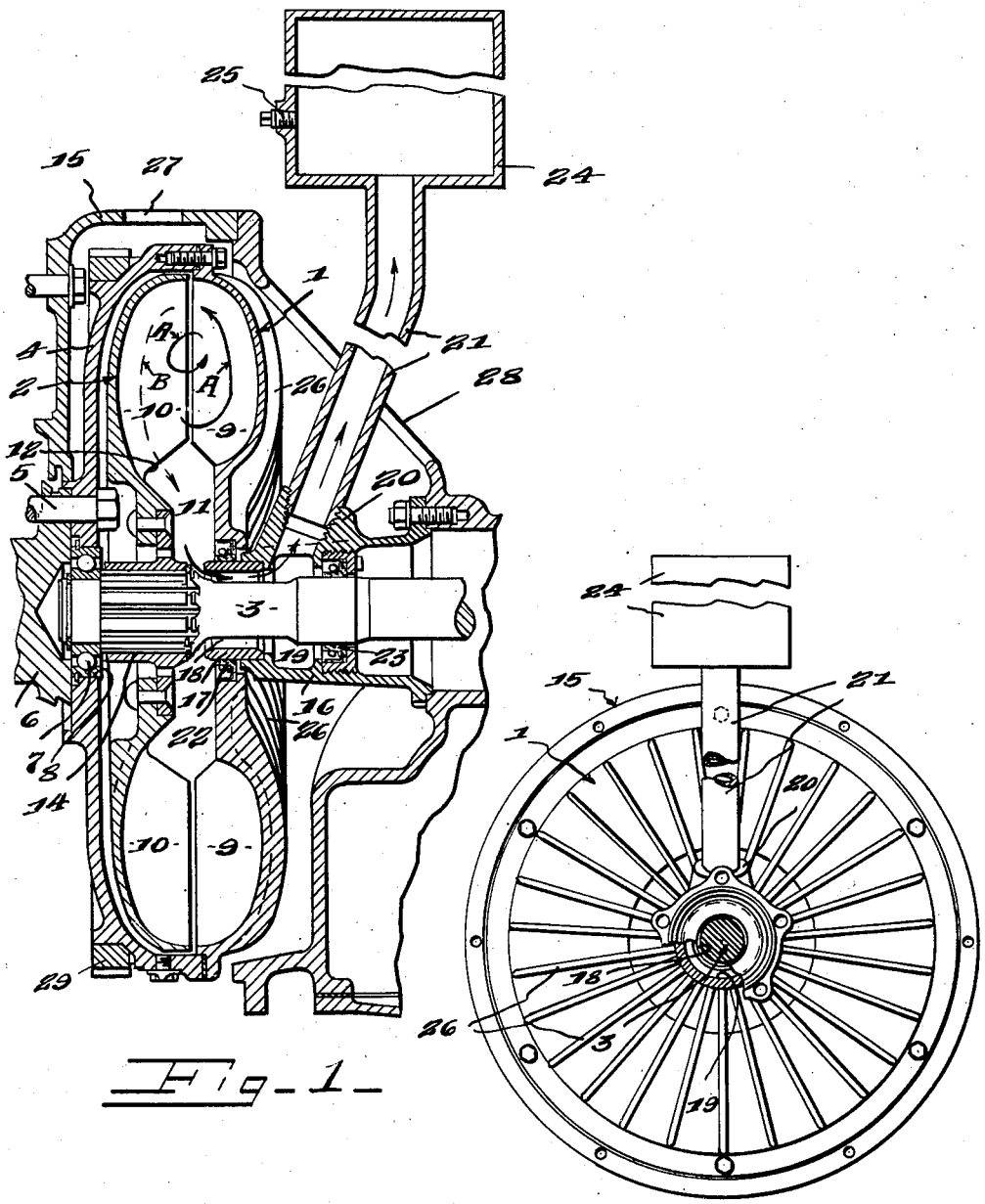

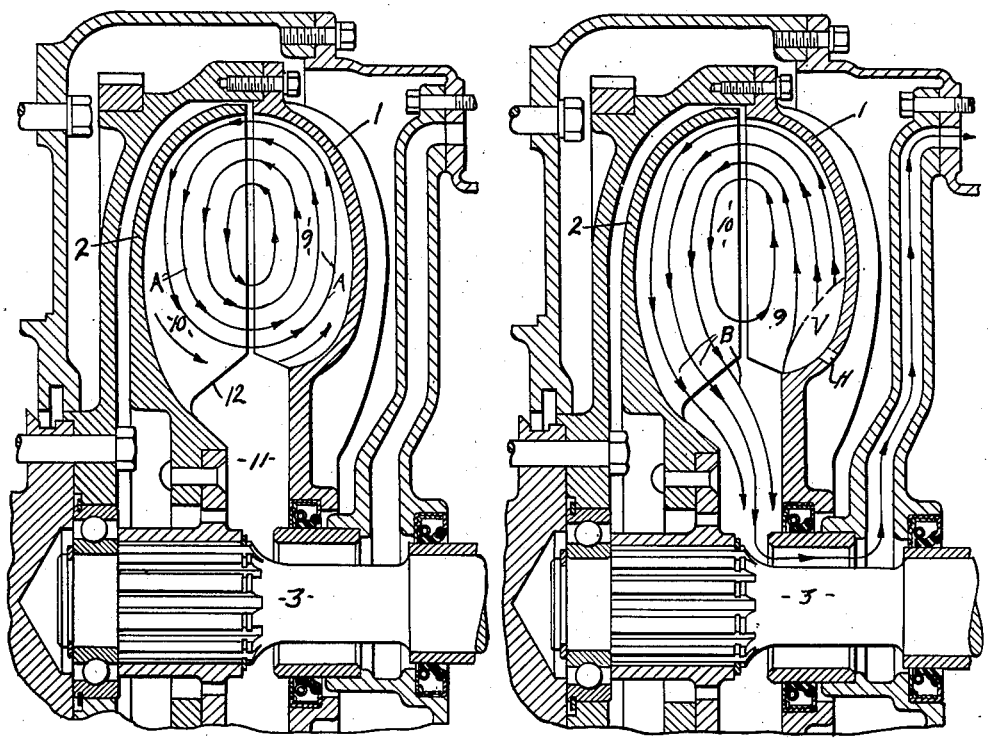
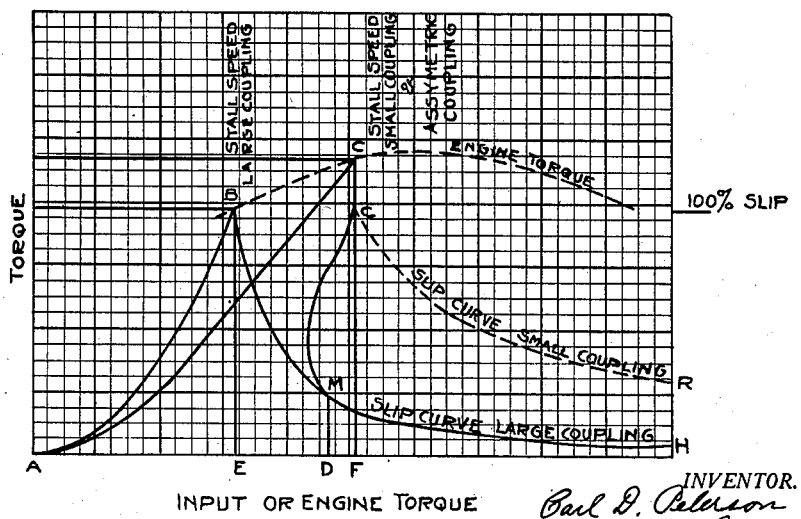

Patented Nov. 16, 1943

2,334,282

UNITED STATES PATENT OFFICE 2,334,282

HYDRAULIC COUPLING

Carl D. Peterson and Albert H. Deimel,
Toledo, Ohio

Application April 23, 1940, Serial No. 331,168

4 Claims. (Cl. 60—54)

The invention relates to hydraulic couplings or fluid fly wheels of the Fottinger or van type, and has for its object a construction and arrangement of impeller and runner to provide a central chamber between them radially inward from the working chamber in which the vanes are located, and means forming a unitary part of the coupling structure for guiding the fluid from the runner vanes into the central chamber and away from the inner ends of the vanes of the impeller, when slippage occurs, in contradistinction to directing the flow from the inner ends of the runner vanes to the inner or receiving ends of the impeller vanes, this means being here illustrated as an extension of the working or vane chamber of the runner inwardly into the central chamber a greater distance than the working or vane chamber of the impeller, all whereby the coupling or the working chamber thereof normally runs full with both impeller and runner rotating, and if the runner is stopped or greatly retarded from rotating with the impeller, a portion of the fluid is pumped out by the action of the rotating impeller into the central chamber creating a void within the coupling which acts counter to the centrifugal force of the impeller and establishes a state of suspension of the fluid within the coupling, but holds a part of the fluid in the impeller in a state of suspension or balance between the centrifugal force, due to rotation and the counterforce or void, and when the runner is allowed to again rotate, the centrifugal force is gradually built up on the fluid in the runner due to this rotation. The centrifugal force is opposed to the centrifugal force produced on the fluid in the impeller. As a result, the fluid again fills up the working chamber in which the vanes are located. In other words, with the runner stationary, the flow of fluid out of the impeller is not opposed and the fluid is pumped into or through the central chamber until a balance is reached. Under this condition, since only a portion of the fluid is active, the effectiveness of the fluid is reduced when the runner is stationary. This means that idling drag is reduced and the stall speed is raised. In other words, the impeller will have to run at higher speed with the runner stationary to hold full torque of the engine, but as soon as the runner revolves, that is, as soon as the vehicle begins to move, this condition is changed and the coupling fills up, as the slip decreases, permitting the fluid flow to become more effective, since the state of balance or suspension does not exist in the impeller with the runner rotating at nearly the same speed. Therefore, as soon as the vehicle begins to move, the coupling rapidly becomes effective and the slip is very rapidly reduced to low value. Thus, we have a coupling with low drag at engine idling speeds and yet low slip at vehicle operating speed, which two effects are desirable but usually can not be decreased together.

In some installations heretofore developed or proposed, the fluid has been extracted from the coupling by means of orifices or valves in the circumference of the coupling, when low drag was required, fluid being pumped in when the coupling is to transmit a load. This method not only involves complicated pumps and valves, but is too slow for automotive work, as quite some time is consumed in filling and emptying the coupling in this manner. By such means, the reduction of the drag is due solely to the amount of fluid removed.

In this invention, the low drag characteristics are brought about not only by removing some fluid, but also by preventing circulation of the fluid or interfering with the circulation by balancing against the centrifugal force, the fluid remaining in the impeller after a small amount is withdrawn to the central chamber of the coupling, so that fluid remaining in the impeller is in a state of suspension between a vacuum created in the impeller by the outpumping of the fluid and the centrifugal force built up by the impeller. It is understood that the circulation of the fluid or the vortex created between the vanes of the impeller and runner transmits the power, and that if the circulation is interrupted or interfered with, the torque transmitted or the drag is gradually reduced. Also, it is not possible to extract enough fluid from the coupling to reduce the drag, unless a separate air inlet is provided into the coupling. The interior of the coupling of this invention is air tight or air bound, so that upon withdrawal by the pumping action of the impeller with the runner stationary, a sufficiently small amount of fluid is pumped out of the coupling in a second or so to create a state of suspension or balance in the liquid remaining in the coupling, and hence the low drag. The small amount may be returned in a second or so by allowing the runner to rotate.

The hydraulic coupling of this invention thus carries out a method of operation by which a comparatively small quantity of fluid is expelled from the working chamber in which the vanes of the impeller and runner are located, to the center of the coupling, the quantity being sufficient to create a vacuum or void within the coupling that balances the centrifugal force of the fluid and holds the fluid remaining in the impeller in a state of suspension, by which the fluid is drawn back into the coupling under the action of the centrifugal force produced by the rotation of the runner, when the runner is free to rotate with, and to build up to the speed of the impeller. In the illustrated embodiment of the invention, the central chamber communicates through a suitable conduit with an expansion tank.

Other minor objects appear throughout the specification.

The invention consists in the method of operation and in the novel features and in the combinations and constructions hereinafter set forth and claimed.

In describing this invention, reference is had to the accompanying drawings in which like characters designate corresponding parts in all the views.

Figure 1 is a vertical sectional view of a coupling embodying one form of the invention.

Figure 2 is an elevation on a reduced scale looking to the left in Figure 1.

Figure 3 is a view similar to Figure 1 of a slightly modified form of the coupling, the tank being omitted.

Figure 4 is a sectional view taken on line 4—4, Figure 3.

Figures 5 and 6 are fragmentary opposing face views of the runner and the impeller.

Figures 7 and 8 are fragmentary longitudinal sectional views of the coupling; Figure 7 showing the normal vortex, and Figure 8 the path of the fluid and the location of the void or vacuum when the runner is stopped or greatly retarded relative to the rotating impeller.

Figure 9 is a chart illustrating the result of this coupling and comparing the result of a coupling built in accordance with this invention with that of hydraulic couplings heretofore developed or used.

1 and 2 designate, respectively, the impeller and runner, and 3 the driven shaft, the impeller enclosing the runner and being provided with a casing section or portion 4 enclosing the runner and secured, as by bolts 5, to a driver, as the shaft 6 of the engine of the vehicle in which this transmission mechanism is installed. The impeller, or the casing portion 4 thereof, has a journal bearing concentric with the shaft 3. The shaft 3 is axially alined end to end with the drive shaft 6 and the journal bearing 7 for the impeller 1 or the casing 4 thereof is interposed between the shaft 3 and the wall of a central bearing opening 8 in the casing portion 4, this journal bearing also acting as a pilot and thrust bearing for the shaft 3, in the drive shaft 6. This coupling is of the vane type and is air tight, and the impeller is formed with radial vanes 9, and the runner with radial vanes 10. The impeller and runner are spaced apart to provide a central chamber 11 around the shaft 3. The vanes 10 of the runner extend at 12 farther into the chamber 11 toward the axis of the shaft 3 than the vanes 9 of the impeller for a purpose hereinafter explained. The runner 2 has a hub 14 splined on the shaft 3.

15 designates a housing enclosing the coupling, that is, the impeller and runner, and this housing is formed with a hub 16 around the shaft 3 on the side of the impeller opposite to that on which the runner 2 and the bearing 7 are located, this hub being provided with a tubular portion 17 spaced from the shaft 3 and forming an annular passage 18 around the shaft, which passage communicates with the chamber 11 and also with an annular passage 19. The hub 16 is provided with a radial coupling 20 for connection to a conduit 21 for a hydraulic fluid. The impeller 1 has an oil sealed bearing 22 around the tubular portion 17 and also there is an oil seal 23 within the hub 16 to prevent the passage of the hydraulic fluid out along the shaft 3.

The conduit 21 preferably extends upwardly and communicates with a stationary tank 24 (Figures 1 and 2) formed to vary the pressure on the hydraulic fluid, the tank being enclosed and air-bound. It is provided with a suitable removable plug 25 for determining the level of the oil in the tank 24. During the normal rotation of the impeller 1 and runner 2, when the runner can rotate up to a speed where there is a minimum slip between the impeller 1 and the runner 2, the oil or hydraulic fluid passes or circulates from the impeller to the runner and the runner to the impeller in a vortex or path illustrated by the arrows A, and during this operation, when both runner and impeller are rotating, the centrifugal force of the fluid tends to create a vacuum in the chamber 11, which vacuum draws the hydraulic fluid into the coupling from the tank 24, so that the coupling is completely filled. When the runner is stationary, and the impeller is rotated by the engine with the throttle in idling position, as when the vehicle is stopped and in gear, a small portion of the fluid quickly unloads from the coupling, until the balance or state of suspension of the fluid remaining in the coupling is reached, the fluid taking a path indicated by the arrows B into the chamber 11 through the conduit 21 to the tank 24 and compresses the air in the air-bound tank 24.

The extension of the vanes 10 at 12 of the runner farther into the chamber 11 than the vanes 9 constitutes the feature self-contained or built into the coupling itself which effects the quick explusion of a small portion of the fluid, until the balance between the void at the center of the coupling and the centrifugal force at the low idling R. P. M. is reached, and the quick return, upon acceleration above idling R. P. M.

In order to effectively cool the coupling, the impeller 1 is provided with radially extending fan blades 26 and the housing 15 with peripheral outlets 27 arranged out of radial alinement with the blades 26, this arrangement eliminating wind noise or so-called siren effect. The housing 15 or the rear wall thereof is formed with a suitable opening 28 for the entrance of air. This opening 28 may conveniently be used to extend the conduit 20 outside of the housing 15. The impeller or the casing portion 4 thereof is also provided with a ring gear 29 for coacting with the pinion of a starting motor, not shown.

The structure thus far described is substantially the same as in our pending application, Serial Number 306,526, filed November 28, 1939, now Patent No. 2,276,862, granted March 17, 1942, of which this application is a continuation-in-part.

In Figs. 3 and 4, the construction in the main is substantially the same, but the tank 24 is provided with means for creating a vacuum therein. The vacuum may be created in any suitable manner, as by connecting the upper part of the tank 24 to a source of vacuum, as the intake manifold of the engine by a pipe 30.

In the form shown in Figs. 3 and 4, the bearing 70 corresponding to the bearing 7, is interposed between the hub 14 of the runner and the casing portion 4 of the impeller. Also, a hub 160 corresponding to the hub 16 is formed on a diametrically extending bracket 31 secured to the back plate structure 32 of the housing 33, which corresponds to the housing 15, one arm of this bracket 31 being formed hollow to provide a passage 35 leading from the interior of the hub 160 and the annular passage 18 thereof. This passage 35 communicates through a hole 36 in the back plate 32, with the conduit 37 leading to the tank 24 (Figure 4) in which the vacuum is produced. The shaft 3 has mounted thereon a brake drum 38 adjacent the front wall of the gear box 39 which drum coacts with a brake band 40, this being operable to stop the runner and also to effect a reverse movement of the shaft 3, after being stopped, to effect the crossing of the speeds of the driving and driven elements of clutches of the transmission gearing in the gear box, when these clutches embody balking rings for preventing engagement of the clutches until the speeds synchronize or cross. To brake forms no part of the invention, except that the web of the brake drum is provided with fan blades at 41 for directing the outside air against the center of the fan blades 26 on the impeller. The shaft 3 is usually the input shaft of a transmission gearing. Preferably, the blades 10 of the runner, as seen in Figure 5, are inclined slightly out of the radial, while the vanes 9 of the impeller are radial. It is desirable to have as many vanes as possible, and the number that can be used depends on the manner in which the vanes are formed. When the vanes are cast, as great a number can not be used in the same area as when they are made of sheet metal and welded or otherwise secured into position. The inclining of the vanes of the runner compensates for an equal and greater number of radial vanes on both the impeller and runner.

The general operation of the coupling embodying the fundamental idea pointed out is:

Assume the coupling is rotating with no slip. Due to the centrifugal force, the fluid will be thrown to the rim of the coupling, and if the coupling is not full of fluid, all air will be driven to the center of the coupling. As the speeds of the impeller and runner are the same, there will be no circulation of fluid between the impeller and the runner, since there is a balance of pressure in the impeller and runner, or the fluid pressure at the periphery of the runner is equal to that at the periphery of the impeller.

Now assume that the runner is slowed down to somewhat slower speed than the impeller, say, for instance, five percent less speed, there will now be a circulation of fluid between the impeller and runner, since the pressures, due to the centrifugal force in the impeller and runner, are no longer equal and balanced. Hence the fluid will flow from the tips of the impeller vanes to the tips of the runner vanes down or radially inward of the runner vanes toward the axis of the coupling, and then back into the impeller vanes at the inner ends thereof. The fluid moving out of the impeller vanes tends to create a void at the inner ends of the impeller vanes, but no void occurs under small slip as the fluid flowing radially inward in the runner vanes is sucked across into the inner ends of the impeller vanes. The kinetic energy of the fluid flowing radially inward in the runner vanes is overcome, since the runner is rotating. Therefore, at the inner diameter of the path, even if the runner vanes are not curved to direct the fluid toward the inner ends of the impeller vanes, or even though the fluid is free to flow directly from the runner into the central chamber, a very slight amount of suction will transfer the fluid from the runner to the impeller vanes. Now if the runner is stopped or slowed down more, until its speed is sufficiently less than the impeller, so that the condition is analogous to that occurring when the runner is stopped, the fluid is no longer flowing against the centrifugal force in the runner vanes, or if the runner is not stopped, is flowing against a relatively weak centrifugal force in the runner vanes. However, with the symmetrical coupling or couplings heretofore developed or used, the fluid is guided or directed to the inner ends of the impeller vanes and the path of the flow of the fluid remains the same. The amount of flow is increased enormously however, since it is produced by the full centrifugal force of the impeller and not merely by the difference between the centrifugal force of the impeller and the centrifugal force of the runner.

However, as in a coupling embodying this invention, where the coupling is asymmetrical, and the fluid is directed from the inner ends of the runner vanes away from the inner ends of the impeller vanes, and is guided directly toward the axis of the coupling into a central chamber for receiving it, then a void or vacuum must be built up in the impeller vanes at the inner radial ends thereof.

The void at the inner ends of the impeller vanes produces a heavy suction acting on the fluid in the runner vanes, and this void deflects some of the fluid into the impeller vanes, but due to the open passage or the guiding of the fluid directly into the central chamber from the runner vanes, considerably less amount of fluid reenters the impeller vanes than in the symmetric coupling.

Thus, under no or low slip condition, there is a circulation, as shown by the arrows A (Figure 7), whether the coupling is symmetric or asymmetric. Under stall conditions, that is, with the runner stationary or with the runner rotating at low speed relatively to the impeller, so that conditions are analogous to stall conditions, the circulation in a symmetric coupling is the same, although at a much higher rate. But with the asymmetric coupling or a coupling embodying the features of this invention, flow conditions result as shown by the arrows B in Figure 8. A void V is built up as shown in Figure 8, as the fluid is guided into the central chamber 11. That such a void actually exists has been proved by drilling a hole, as shown at H. Under stall conditions, no fluid leaks out of the hole, but if the runner is released and allowed to rotate sufficiently to build up the circulation at low slip, then the coupling fills up and fluid sprays out of the hole.

One of the desirable results of the coupling built in accordance with this invention is that torque at constant input speed is equal at both one hundred percent slip and fourteen percent slip. This characteristic produces both improved acceleration, reduced fuel consumption and reduced heat loss in actual service in the vehicle.

To illustrate the characteristics and advantages of this coupling, reference is made to Figure 9 where some performance curves plotting torque against engine speed are shown. Considering a standard coupling, curve AB is the stall curve on torque taken by the coupling with the runner stationary. Where this curve crosses the engine torque curve, is the stall speed for an engine with this coupling, point B being the maximum speed the engine can attain with the vehicle held stationary. If the vehicle brakes are now released, the vehicle wheels and with them the runner, begin to rotate decreasing the slip. Assuming for the sake of illustration that the brakes are released at point B, which is the one hundred percent slip point, and plotting the slip against the engine speed, the result is curve BMH.

Since the stall speed is too low, the engine can not develop its full torque at stall. If we now use a smaller coupling we get a higher stall speed corresponding to the point C. Now releasing the brakes and plotting the slip against the engine speed, the curve CR is the resultant. With this curve CR, the slip with high engine speed will be high, represented by the point R. Whereas with the larger coupling, the slip at this engine speed is at H.

Now substituting a coupling embodying the construction of this invention, we have the stall speed at C or the desirable high stall speed of a relatively small coupling. As the runner is allowed to rotate, as by releasing the vehicle brakes, the small coupling curve CR will not result but the coupling will gradually refill with fluid as the slip decreases and the curve will be CMH. Thus, we have the low slip with the vehicle moving of the large coupling and the high stall speed of the small coupling, combining the advantages of both performances with the disadvantages of neither. All operations will be somewhere between the two extreme curves shown.

The coupling of this invention gives:

(1) High starting torque of an undersize coupling without the high slip and low efficiency and consequent poor fuel economy and overheating of the undersize coupling at ordinary operating speeds;

(2) Low slip at ordinary running speeds of the full size symmetric coupling without the poor starting torque and without the low speed laboring of the engine and consequent poor fuel economy of the engine.

In Figure 7, the arrows A show the circulation at low slip with working chamber full of fluid.

In Figure 8, the arrows B show the condition with high slip where the fluid flows into the central chamber of the coupling instead of returning to the impeller from the runner.

In other words, this hydraulic coupling is constructed to operate to utilize two centrifugal forces to automatically vary the quantity of fluid in the working chamber of the coupling. The two centrifugal forces are (1) the centrifugal force due to rotation of the coupling about its axis, that is, fly wheel centrifugal force; and (2) the circulating centrifugal force in the vortex due to its circulation in a circular path in the working chamber of the coupling of the impeller and runner under the action of the impeller. The direction of the circulation in the runner is contrary to the action of the fly wheel centrifugal force. When the fly wheel centrifugal force in the runner predominates, the vortex circulates without loss of fluid. When the circulating centrifugal force in the vortex predominates, the fluid flows freely and unobstructedly from the runner directly into the central chamber, this occurring under high slip condition. High slip roughly may be said to be the slip of greater than two-thirds.

The fundamental idea lies in the free, unobstructed flow of fluid in the vortex from the portion of the working chamber in the runner into the central chamber under high slip condition, when the circulating centrifugal force in the runner predominates over the fly wheel centrifugal force on the fluid in the runner; and also in the reverse of this operation, that is, the quick filling of the working chamber from the central chamber under low slip condition, or as the fly wheel centrifugal force in the runner builds up and overcomes the circulating centrifugal force in the vortex. Thus, in this coupling, the working chamber and the central chamber are arranged to vary the fluid content of the working chamber by utilizing the predominance of the centrifugal force of the vortex rotation in the working chamber at high slip to partially empty the working chamber, and utilizing the predominance of centrifugal force of the coupling rotation at low slip to completely fill the working chamber. In order to do this, the central chamber is at least of such capacity as to receive a substantial volume of fluid from said working chamber or to nearly empty the working chamber.

What we claim is:

1. A hydraulic coupling including an impeller and a runner of the opposed vane type having a working chamber in which the vanes are located, the working chamber being free of baffles and obstructions, the coupling being formed with a central chamber located radially inward from the working chamber toward the axis of the coupling, the portion of the runner adjacent the central chamber being shaped to direct the fluid into the central chamber away from the inner ends of the vanes of the impeller, when the slip is high.

2. A hydraulic coupling of the kinetic type including vaned impeller and runner elements having a working vortex chamber and a central chamber located radially inward of the working chamber, of sufficient capacity to receive a large portion of the fluid from the working chamber, the central inner wall of the runner element being formed to direct fluid into the central chamber and away from the impeller element so that the fluid content of the coupling is automatically varied in the working chamber thereof by utilizing the predominance of the centrifugal force of the fluid in the runner due to vortex circulation, over the centrifugal force in the runner due to runner rotation at high slip, to partially empty the working chamber, and utilizing the predominance of the centrifugal force in the runner due to runner rotation, over the centrifugal force of the fluid in the runner due to vortex circulation at low slip, to completely fill the working chamber.

3. A hydraulic coupling of the kinetic type comprising impeller and runner elements forming a working chamber free of baffles and obstructions, a central chamber located inwardly of the working chamber and adapted to receive a substantial volume of fluid from said working chamber, the inner portion of the runner having a bladeless space and being formed to direct fluid into the central chamber and away from the impeller, said chambers being arranged to vary the fluid content of the working chamber by utilizing the predominance of the centrifugal force of vortex rotation in the working chamber at high slip to partially empty the working chamber and utilizing the predominance of the centrifugal force of coupling rotation at low slip to completely fill the working chamber.

4. A hydraulic coupling of the kinetic type comprising vaned impeller and runner elements having a working chamber in which the vanes are located, a chamber opening into the working chamber on the inner side thereof toward the axis of the coupling, the connecting walls of said chambers being free of obstructions and the portion of said walls in the runner being arranged to direct fluid into the inner chamber to vary the fluid content of the working chamber by utilizing the predominance of the centrifugal circulating force of the fluid in the vortex around the circular axis of the working chamber at high slip, to partially empty the working chamber, and utilizing the predominance of centrifgugal force due to coupling rotation around the axis of the coupling at low slip, to completely fill the working chamber.

CARL D. PETERSON.
ALBERT H. DEIMEL.